(12) United States Patent
Terrill et al.

(10) Patent No.: US 7,436,530 B2
(45) Date of Patent: Oct. 14, 2008

(54) METHOD AND SYSTEM FOR PRINT CONSUMABLES MANAGEMENT

(75) Inventors: Jody L. Terrill, Boise, ID (US); Robert Sesek, Meridian, ID (US); Orhan E. Beckman, Camas, WA (US); Robert Scott Femling, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1227 days.

(21) Appl. No.: 10/132,363

(22) Filed: Apr. 25, 2002

(65) Prior Publication Data

US 2003/0202204 A1 Oct. 30, 2003

(51) Int. Cl.
*G06F 3/12* (2006.01)
(52) U.S. Cl. .................... 358/1.15; 358/1.14; 358/1.12; 710/17; 710/16; 710/15
(58) Field of Classification Search .................... 399/23, 399/24, 27, 12; 709/224, 226, 232, 500; 358/1, 1.15, 1.14, 296, 1.12; 340/540; 707/10; 705/29, 26, 27; 714/47; 710/15, 16, 17
See application file for complete search history.

(56) References Cited

U.S. PATENT DOCUMENTS

| | | | | |
|---|---|---|---|---|
| 5,636,032 A * | 6/1997 | Springett | .................... | 358/296 |
| 6,275,664 B1 * | 8/2001 | Wolf et al. | .................... | 399/8 |
| 6,405,178 B1 * | 6/2002 | Manchala et al. | ............. | 705/29 |
| 6,430,711 B1 * | 8/2002 | Sekizawa | .................... | 714/47 |
| 6,466,326 B1 * | 10/2002 | Shima | .................... | 358/1.12 |
| 6,573,910 B1 * | 6/2003 | Duke et al. | ................ | 715/740 |
| 6,768,994 B1 * | 7/2004 | Howard et al. | ................ | 707/10 |
| 6,798,997 B1 * | 9/2004 | Hayward et al. | ............. | 399/12 |
| 6,947,161 B2 * | 9/2005 | Suyehira | .................... | 358/1.15 |
| 6,952,726 B1 * | 10/2005 | White et al. | ................ | 709/224 |
| 7,019,859 B2 * | 3/2006 | Phillips et al. | ............. | 358/1.15 |
| 2002/0059106 A1 * | 5/2002 | Tani | .................... | 705/26 |
| 2002/0080381 A1 * | 6/2002 | Haines | .................... | 358/1.14 |
| 2002/0099630 A1 * | 7/2002 | Aruga et al. | ................ | 705/28 |
| 2002/0105668 A1 * | 8/2002 | Lilland et al. | ............. | 358/1.14 |
| 2002/0135799 A1 * | 9/2002 | Simpson et al. | ............. | 358/1.15 |
| 2002/0171871 A1 * | 11/2002 | Catt et al. | .................... | 358/1.18 |
| 2002/0186406 A1 * | 12/2002 | Phillips et al. | ............. | 358/1.15 |
| 2002/0191213 A1 * | 12/2002 | Laverty et al. | ............. | 358/1.15 |
| 2003/0002074 A1 * | 1/2003 | Miyano | .................... | 358/1.15 |
| 2003/0030838 A1 * | 2/2003 | Marr | .................... | 358/1.15 |
| 2003/0043401 A1 * | 3/2003 | Abel et al. | ................ | 358/1.14 |
| 2003/0071726 A1 * | 4/2003 | Hopper et al. | ............. | 340/540 |
| 2003/0217201 A1 * | 11/2003 | Gargi et al. | .................... | 710/16 |
| 2004/0204986 A1 * | 10/2004 | Shimbori et al. | ............. | 705/14 |
| 2007/0159647 A1 * | 7/2007 | Carling et al. | ............. | 358/1.12 |

* cited by examiner

*Primary Examiner*—David K Moore
*Assistant Examiner*—Ashish K Thomas (57) ABSTRACT

A method for managing just-in-time print consumables for a print job can be performed on a computer server. The method includes estimating print consumable requirements for the print job. The method also includes ordering, over a network connection, the estimated print consumable requirements from a print consumable supplier such that the estimated print consumable requirements are received substantially close to a time that the print job is to be performed.

17 Claims, 6 Drawing Sheets

| | COLORPRESS SYSTEM 8000 | | | ▽ △ ? | |
|---|---|---|---|---|---|

JOBS
QUEUE
STORED
HISTORY

SUPPLIES
INK
PAPER
HISTORY

ADMINISTRATION
SERVICE & MAINTENANCE
NETWORK
NOTIFICATION
DIAGNOSTICS
UPGRADE
PRIVILEGES
OPTIONS

HELP
INDEX
SEARCH
TUTORIALS
DEVICE INFORMATION

| STATUS | DOCUMENT | CLIENT | TIME COMPLETION | COPIES | PAGES | SUPPLIES |
|---|---|---|---|---|---|---|
| • PRINTING | BROCHURE.PSD | PETER | 4:46 PM TODAY | 249 | 1 | OK ○○ |
| • RIPPED | REPORT.DOC | JOHN | 7:37 PM TODAY | 48 | 1 | OK ○○ |
| • QUEUED | ANNUALRPT.PPT | MARY | 8:02 PM TODAY | 1 | 1 | OK ○○ |
| • QUEUED | BUDGET.DOC | ORHAN | 8:17 PM TODAY | 1 | 1 | OK ○○ |
| • QUEUED | NEXT YEAR'S COS.. | CATHY | 8:18 PM TODAY | 2 | 1 | OK ○○ |
| • QUEUED | ALASKA AD.AI | PETER | 8:22 PM TODAY | 1 | 1 | OK ○○ |

800

805

?

MARCH 03,2001

FIG.8

METHOD AND SYSTEM FOR PRINT CONSUMABLES MANAGEMENT

BACKGROUND OF THE INVENTION

Printing systems generally rely on human involvement to estimate the amount of print consumables required to complete a print job and then supply the consumables required for the print job. The print consumables may include marking agents (e.g., ink or toner), print media (e.g., paper, transparencies), or any other item that the printer uses that may later require replacement.

When a print job is received, the print shop operator typically first reviews the print job in order to determine if it is comprised of text, graphics, or text and graphics, the type of media required, whether it will be printed simplex or duplex and the number and type of inks required (1, 2, 4-color, 6-color, 4 with fifth spot color, 4 with fifth as overcoat, etc). Based on the number of pages, the consumables that might be required to complete the job are then estimated. The operator checks the print shop inventory to determine if the required consumables are on hand for the job. If some of the required consumables are not in the inventory or there is not enough of a certain consumable, the operator then has to order these supplies manually. This process is time consuming and expensive since it requires a paid human operator to perform most of the steps. This method also relies on human judgment and is consequently prone to error. This is particularly true if an operator does not have adequate experience estimating print jobs or because of the complexity of a particular print job the difference between estimated consumables and the actually-required consumables can vary greatly.

An additional problem is that the consumables are typically stored on site in order for the print shop operator to be able to access the consumables in an efficient manner and provide them to the printing system. This again adds expense to the process since a sufficiently large storeroom must be maintained for the consumables. There is a resulting need in the art for a way to estimate print job requirements for print consumables and provide the print consumables just-in-time for the printing job to be performed.

DETAILED DESCRIPTION OF THE PREFERRED EMBODIMENT

The present invention provides a method and system to estimate print consumables required to perform a particular print job and then order those consumables just-in-time for the print job to be performed. This has the advantage of keeping storage and human operator costs down while improving print job through-put.

Figure 1:
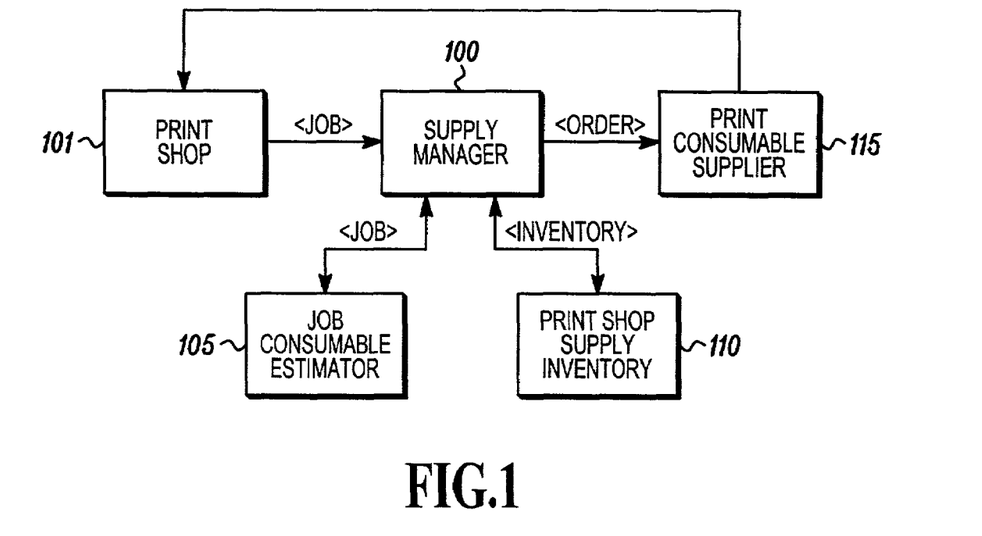
FIG. 1 shows a block diagram of one embodiment of a just-in-time print consumables management system.

FIG. 1 illustrates a block diagram of one embodiment of a print system of the present invention. The system is comprised of a supply manager (100) that is responsible for the overall operation of the system. The supply manager (100), in one embodiment, resides on a computer server in a print shop (101). In another embodiment, the supply manager (100) resides on a computer server that is coupled through a network connection (not shown for simplicity) to a print shop computer terminal (not shown for simplicity). One example of a computer server of the present invention is described subsequently with reference to FIG. 3.

The term "print job" should be construed to include the output file or files of programs such as word processors, graphics programs. A "print job" also includes the output files of devices such as fax machines, copiers and optical scanners, which are to be printed onto media. A "print job" therefore includes photographic images, drawings and other graphics, text or combinations of images, graphics and text, any of which can be embodied as one or files generated using such programs and machines.

"Print job" also includes for instance, a digital image data file, from which a printer driver converts the digital image file into a page description language (PDL) file using well-known techniques in the art. "Print job" can therefore also include PDL files, which are usually transmitted to either a printer buffer or to a separate raster image processor and then to the printer. "Print job" can also include the outputs of raster image processors.

The supply manager (100) initially receives the print job from the print shop (101). This may be accomplished by the print shop operator inputting the parameters of the print job to the supply manager (100) through a terminal coupled to the supply manager (100). In another embodiment, the print job is input to the supply manager (100) through a network connection (e.g., Internet) by the customer who generates the print job.

The supply manager (100) sends the print job to a job consumables estimator (105) that estimates the consumable requirements for the print job. In another embodiment, the job is analyzed by a job consumables estimator before the supply manager sees it. The requirements to be estimated may include the amount of various print consumables required to complete the print job and the time required to complete the print job. In one embodiment, the print consumables are comprised of marking agents (e.g., toner, ink), print media (e.g., paper, transparencies), binding supplies (e.g., staples, comb binders), and finishing supplies (e.g., lamination material).

The job consumables estimator (105) sends the file(s), data structure(s) or other embodiment of the print job's estimated consumables requirements for the print job back to the supply manager (100) for further processing. The supply manager (100) may then query the print shop supply inventory (110) for the quantity of the various print consumables that are stored in the print shop.

The supply manager (100) may then compare the response from the print shop supply inventory (110) to the print consumables estimate. If additional print consumables are required, the supply manager (100) sends an order to an on-line print consumables supplier (115). This order, in the preferred embodiment, is transmitted over the Internet. However, alternate embodiments transmit the order over other types of networks such as intranets, extranets, local area networks, or other types of networks. Still another embodiment, the required print consumables are ordered manually over a network such as a telephone network.

The on-line print consumables supplier (115) receives the order for the print consumables and delivers the print consumables to the print shop through some type of distribution network. In the preferred embodiment, the print consumables are delivered such that they are received by the print shop (101) at substantially the same time that the print job is scheduled to start so that storage of the print consumables is not necessary.

In one embodiment, the system of FIG. 1 operates on a single print computer server. Alternate embodiments use a separate print computer server for each functional block (100, 105, and 110) of FIG. 1. Still other embodiments use other quantities of print computer servers.

Figure 2:
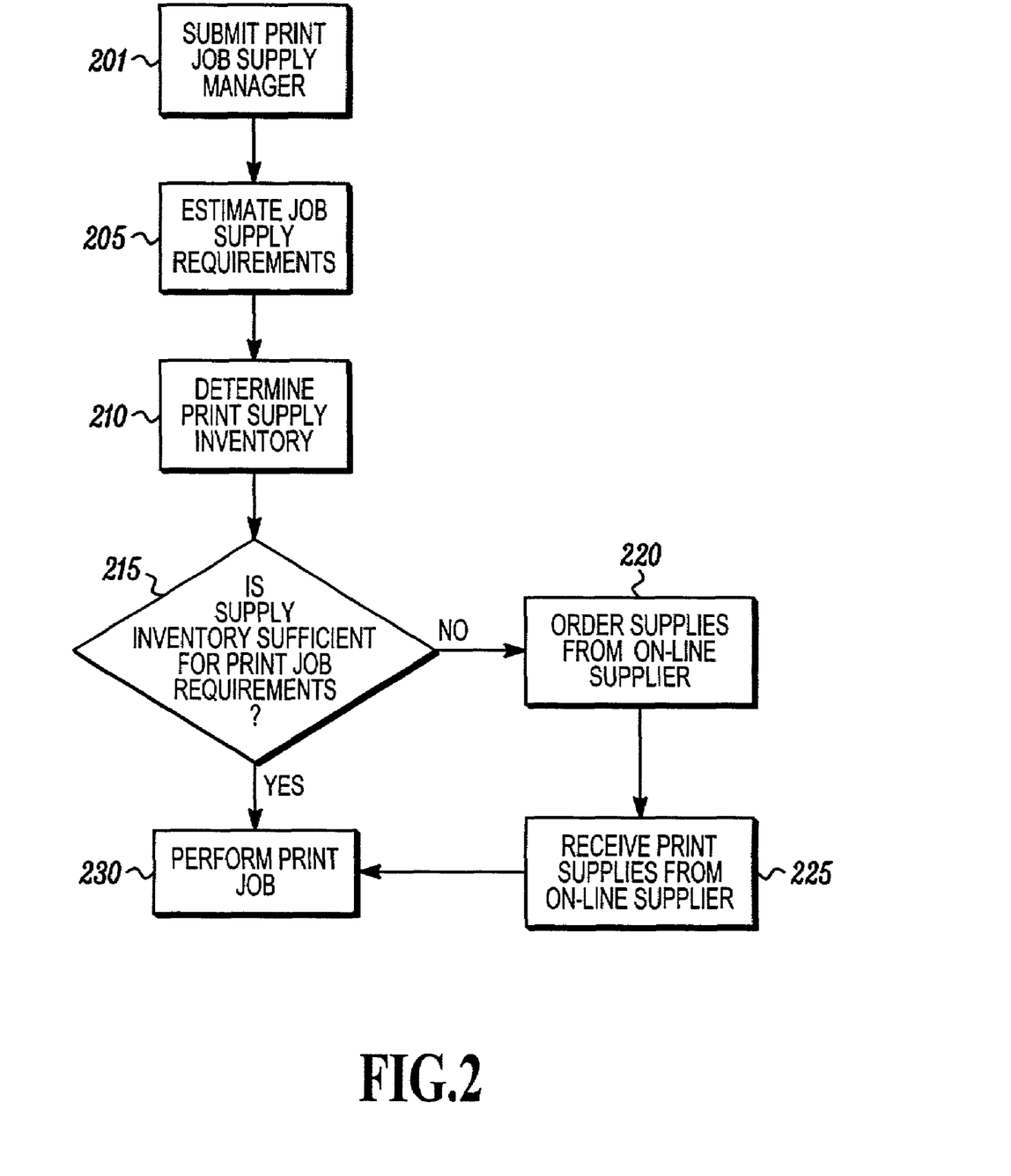
FIG. 2 shows a flowchart for one embodiment of a method for operating the just-in-time print consumables management system of FIG. 1.
Figure 4:
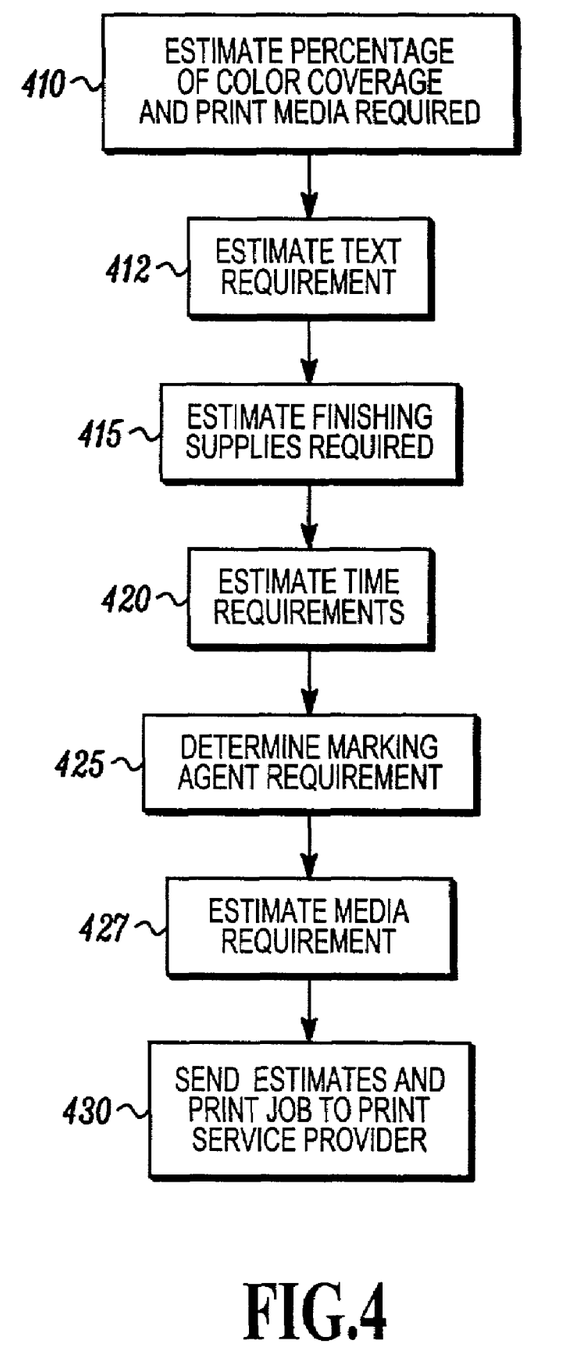
FIG. 4 shows a flowchart for one embodiment of a method for estimating print consumables required for a particular print job.
Figure 6:
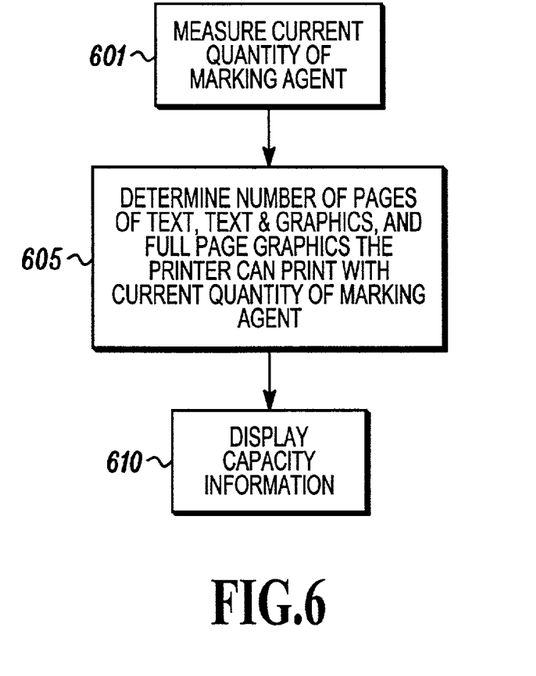
FIG. 6 shows a flowchart for one embodiment of a method for graphically displaying marking agent capacity.
Figure 7:
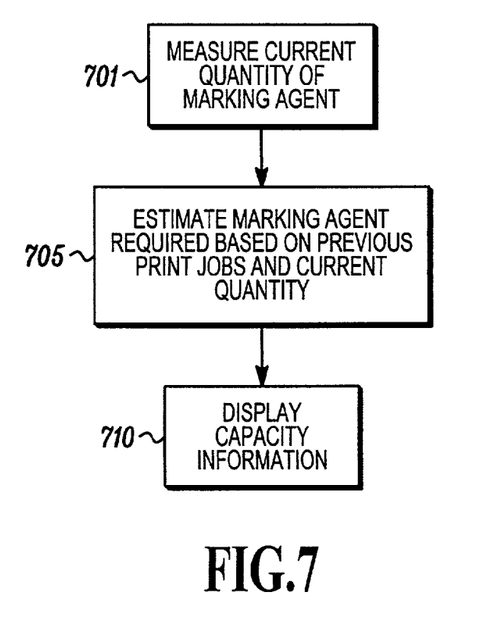
FIG. 7 shows a flowchart of another embodiment of a method for graphically displaying marking agent capacity.

FIG. 2 illustrates a flowchart of one embodiment of the just-in-time print consumables management method of the present invention. In this process, the print job is transmitted to the supply manager (step 201). The supply manager transmits the print job to the job consumables estimator in order to generate an estimate of the print consumables and/or print time requirements (step 205). The estimate may be generated using various methods such as determining the amount of color and text of which the print job is comprised or using past print requirements for a particular user or group of users. Typical examples of estimation methods of the present invention are illustrated in FIGS. 4, 6, and 7 that are discussed subsequently.

In one embodiment of the just-in-time print consumables management method, the supply manager determines whether sufficient print consumables are on hand to fulfill the print job requirements (step 210). This is accomplished by comparing the estimated print consumables requirements with the print consumables supply inventory to generate a quantity of required print consumables for the print job. The comparison takes into account those print consumables that are already designated for other pending print jobs.

If the supply inventory of print consumables is not sufficient for the print job requirements (step 215), the supply manager orders print consumables from an on-line supplier (step 220). In one embodiment, the supply manager transmits an order over the Internet to the supplier to order the required print consumables such that the required print consumables are received substantially close to the time (e.g., within hours) that the print job is scheduled to be performed (step 225). This reduces the amount of inventory required to be stored thereby reducing the cost of the print job. The supply manager can also inform the operator what percentage of a job may be completed given the current inventory on hand and allow the operator to parse the job into what can be completed now and what can be finished when the additional supplies needed to complete the job arrive. This allows the operator the flexibility to 'keep the press running' in the event a whole job cannot be run without additional supplies, with a reminder to finish the job when the supplies arrive. In addition to a reminder the system may allow the operator to schedule the remainder of the job for when supplies will be available.

If the print shop has sufficient supply inventory of print consumables for the print job requirements (step 215), the print job is performed at its scheduled time (step 230).

In another embodiment of the method of FIG. 2, a print consumable supply inventory is not kept. In such an embodiment, the method estimates the print consumables required for each received print job and orders those supplies over a network without checking an inventory supply. The ordered print consumables are then received substantially just-in-time for that particular print job to be performed.

Figure 3:
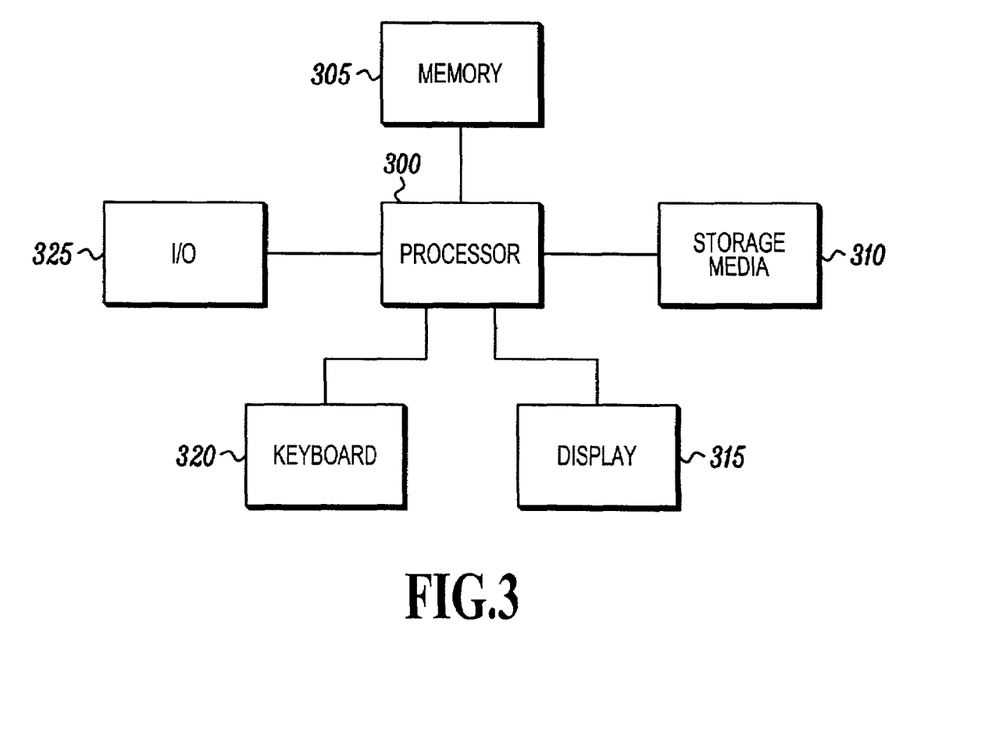
FIG. 3 shows a block diagram of a print computer server in accordance with one embodiment of the present invention.

The above-described processes of the present invention can be run on various print computer servers. One example of such a server is illustrated in FIG. 3. The block diagram of FIG. 3 is only one example of such a server. Other embodiments may require additional functional blocks while still other embodiments require fewer functional blocks.

FIG. 3 illustrates a block diagram of a print computer server in accordance with one embodiment of the present invention. The computer server is comprised of a processor (300) that controls the operation of the computer server. An example of such a processor is a POWERPC or PENTIUM processor.

Memory (305) is coupled to the processor (300). The memory (305) is used by the processor to store print data for display or printing and print data on which the processor (300) is operating. This memory (305) can include semiconductor memory such as random access memory (RAM), read only memory (ROM) or FLASH RAM.

Storage media (310) is used by the processor (300) to store print data for longer term storage than that provided by the memory (305). Examples of storage media (310) can include floppy disk drives, optical disk drives, hard drives, or any other type of storage media. The storage media (310) can be removable or fixed in the computer.

Figures 5, 9:
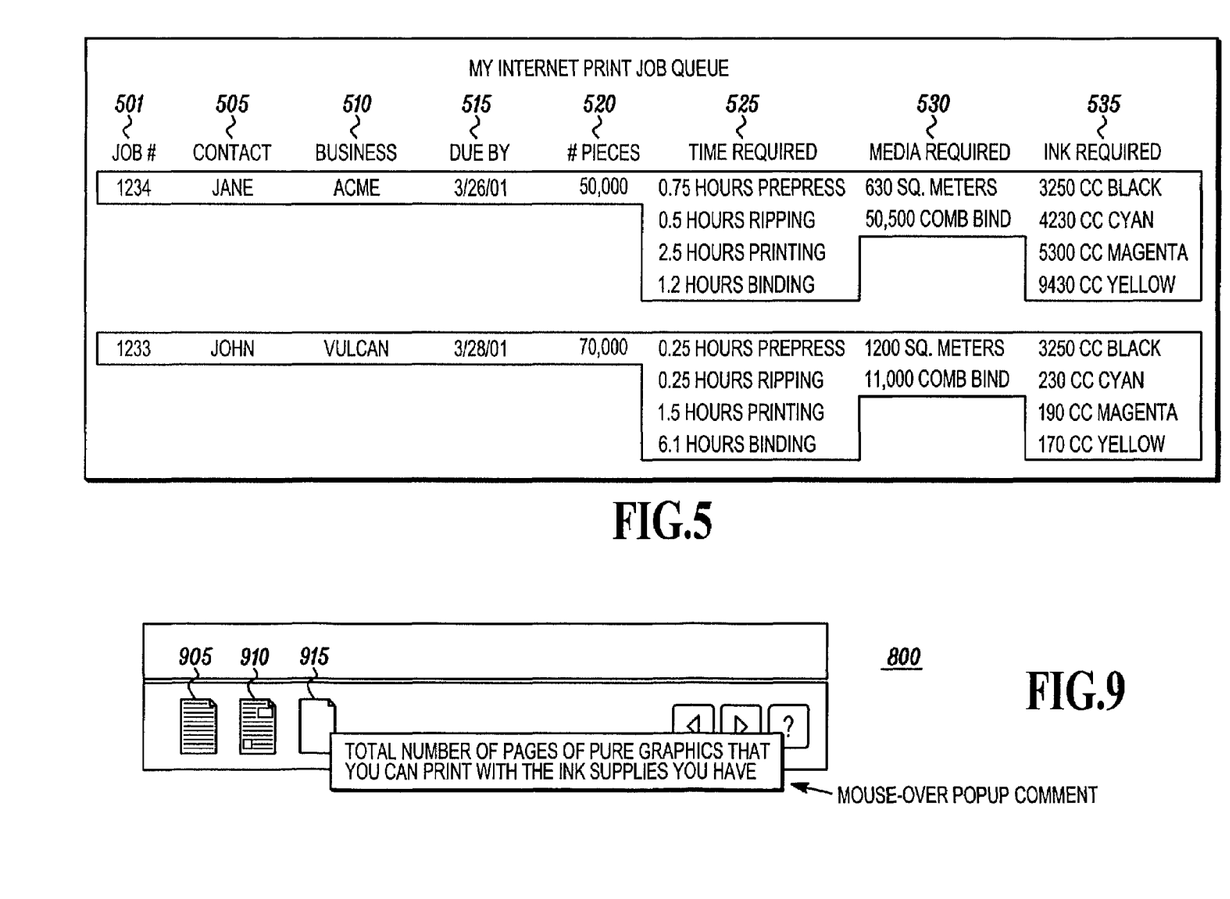
FIG. 5 shows a diagram of one embodiment of a computer display in accordance with the method of FIG. 4.
FIG. 9 shows a diagram of another embodiment of a computer display in accordance with the methods of FIGS. 6 and 7.
Figure 8:
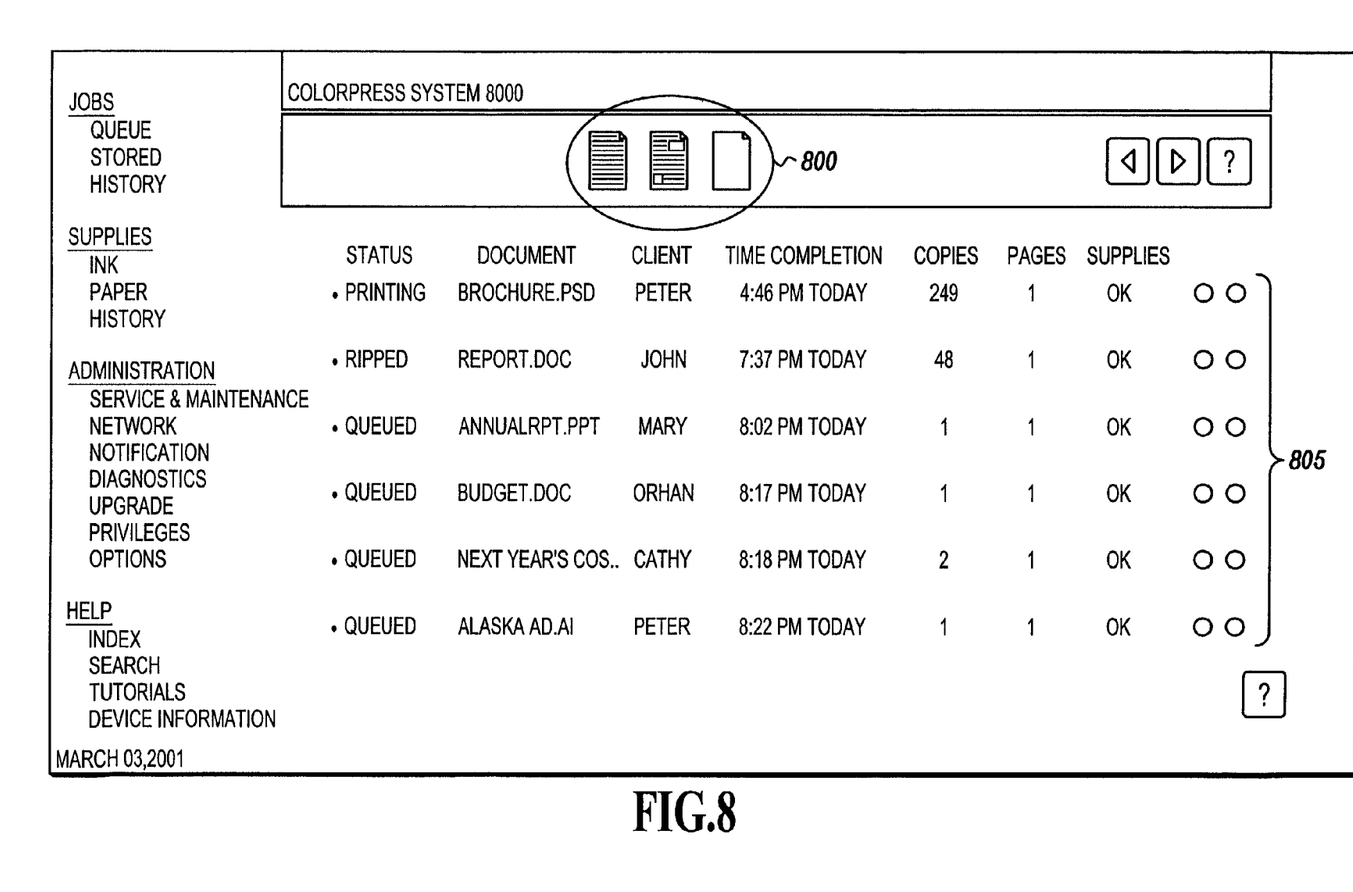
FIG. 8 shows a diagram of one embodiment of a computer display in accordance with the methods of FIGS. 6 and 7.

The processor (300) uses a display (315) or monitor to display information to the computer user. The display (315) may be a liquid crystal display (LCD), a cathode ray tube (CRT), or any other type of display. Examples of typical print displays used by the present invention are illustrated in FIGS. 5, 8, and 9 that are discussed subsequently.

The computer user/print shop operator can use a keyboard (320) to enter data to be used by the processor (300) in generating desired information. The keyboard (320) may be a standard QWERTY-style keyboard with a mouse or trackball. In another embodiment, the keyboard (320) and display (315) may be replaced with a touchscreen display for both display and entry of data.

The computer server also uses input/output (I/O) ports (325) in order to communicate data outside of the computer. These I/O ports (325) can include Universal Serial Bus ports (USB), FIREWIRE ports (IEEE 1394), parallel ports, or any other type of I/O output.

FIG. 4 illustrates a flowchart of one embodiment of a print consumables estimation method that is performed by the print job consumables estimator (105) of the present invention. This method determines the composition of the print job in order to estimate the print consumable requirements.

The estimation method of FIG. 4 estimates the percentage of color coverage, graphics, and print media required by the print job (step 410). Additionally, the method determines the amount of text in the print job in order to estimate the amount of black marking agent required (step 412). Ink/toner requirements can be determined by considering factors such as the amount of ink or toner required to print each page and the number of pages using a particular print density as well as any graphics that need to be printed as well. In addition to the content of each page, page size, pixel density, color and color depth are some of the factors used to estimate the amount of ink or toner required to satisfy a print job's requirements as those skilled in the art will recognize. Rasterized image data, which is output from a raster image processor, can provide information from which an ink/toner estimate can be obtained.

The finishing supplies required may be estimated (step 415) in order to determine the amount of binding and lamination supplies required for the print job. Finishing supplies, in other embodiments, includes any type of media, binding, page protection, and page reinforcement items.

The times required to accomplish various stages of the printing may also be estimated (step 420). For example, in one embodiment, the pre-press time may be estimated at 45 minutes, the press time may be estimated at 2.5 hours of run time for press A, 3.1 hours of run time for press B, and 1.2 hours estimated for the finishing of the job (e.g., binding and laminating). In this example, one press may be required for text while another press is used for color graphics. Alternate embodiments use other time requirements depending on the job and the print shop equipment.

From the estimates of text, color coverage, and graphics, the quantity of marking agents required to complete the print job are estimated (step 425). The marking agent estimates, in one embodiment, are expressed in cubic centimeters (cc's) of marking agent. Additionally, the quantity of print media required to complete the print job is estimated (step 427).

The estimates, along with the print job, are transmitted to a print service provider, print shop, or other location for execution (step 430) they are embodied as data in a file, table, data structure or other appropriate mechanism for transferring information. These data may be transmitted over the Internet or some other type of network. The present invention is not limited to any one type of network.

FIG. 5 illustrates one embodiment of a computer display generated by the estimation method illustrated in FIG. 4. Such a display may be used by a print shop operator in performing the print job. For example, the operator may use the information to manually order print consumables, to perform manual cost estimates on the print job, or to just keep track of what the print equipment is doing.

The display is comprised of a job number (501), the name of a print job contact (505), the name of the business transmitting the print job (510), a "due by" date (515), the number of pieces in the print job (520), the time required to complete various stages of the print job (525), the quantity of print media and finishing supplies required (530), and the amount of ink required (535). The display depicted in FIG. 5 is for purposes of illustration only and does not limit the scope of the present invention.

For example, one embodiment may display the marking agent remaining in terms of the quantity of pages or number of copies of the current print job that can be printed using the remaining marking agent instead of displaying the remaining quantity of marking agent. In such an embodiment, the quantity of marking agent required may be estimated by a method utilizing a set of rules comparing the percentage of color coverage with the amount of text and determining the capacity of the marking agent. The capacity can then be displayed in terms of the number of pages remaining or as a bar graph of pages remaining for a particular marking agent. For example, a color intensive job requires more cyan, magenta, and yellow marking agent and less black, while a text job requires mostly black marking agent and less cyan, magenta, and yellow. A print job requiring both text and color may require a tradeoff between cyan, magenta, and yellow marking agent and black.

FIG. 6 illustrates a flowchart of one example of a method for determining and expressing the capacity of various marking agents. The method determines the remaining quantity of each marking agent (step 601). This may be accomplished by the printer using sensors in each ink tank to determine the marking agent levels. The current marking agent quantity can then be used to estimate the number of pages that quantity of marking agent can print (step 605). In one embodiment, this estimate is performed for pages comprising text, text and graphics, or full-page graphics.

The capacity of each marking agent can be displayed (610) or transmitted over a network to a printer, print shop, or print server for additional processing. In one embodiment, the additional processing may be used to determine if additional marking agent supplies should be ordered.

FIG. 7 illustrates yet another embodiment for determining the capacity of remaining marking agent. In this embodiment, the current quantity of marking agent is measured (step 701). This quantity can then be used to estimate printing capacity by comparing the quantity of marking agent used in previous print jobs that are similar to the current print job (step 705). This comparison may be done on a user basis such that the current print job is compared to print jobs previously done by that user. It is then assumed that the current print job will use a similar quantity of marking agents as the previous types of print jobs from that user. The comparisons may also be performed on a department basis, a job type basis, or any other type of historical analysis. The capacity of each marking agent can be displayed (710) or transmitted over a network to a printer, print shop, or print server for additional processing.

In one scenario, a customer might call the print shop and inquire about a cost for a generic job that is very similar to previously printed jobs. In this embodiment, a generic algorithm using previously printed jobs would provide reasonably accurate results. In another scenario, the customer may send the print job to the print shop and ask for an estimate. Using the actual job parameters of the received print job would likely result in a much more accurate estimate of required consumables and therefore estimated cost.

FIG. 8 illustrates an example of one embodiment of a computer display generated by the estimation methods shown in FIGS. 4, 6, and 7. Such a display may be used by a print shop operator in performing the print job or for determining the status of a print job. For example, the operator may use the information to allocate print jobs according to the quantity of print consumables remaining or to prioritize print jobs on the basis of print consumables remaining.

The display comprises a plurality of icons (800) over which a computer display cursor may be placed to generate a mouse-over pop-up comment, illustrated in greater detail subsequently in FIG. 9. The display may further be comprised of a list of print jobs, their status, and additional information for each print job.

FIG. 9 illustrates a close-up view of the mouse-over pop-up comment icons (800) described in FIG. 8. The computer display cursor may be moved over an icon representing text only (905). This generates a pop-up comment displaying the total number of pages of pure text that can be printed with the current quantity of marking agent. The cursor may be moved over an icon representing text and graphics (910) in order to generate a pop-up comment displaying the total number of pages of text and graphics that can be printed with the current quantity of marking agent. The cursor may also be placed over an icon representing graphics only (915). This generates a pop-up comment displaying the total number of pages of graphics only that can be printed with the current quantity of marking agent.

FIGS. 8 and 9 are for illustration purposes only and do not limit the scope of the present invention. For example, one embodiment may require clicking on the icons instead of moving the cursor over the icon. Another embodiment may be comprised of depicting the number of pages on each icon without use of the cursor.

In summary, the system and methods of the present invention reduce both the time required to perform a print job and the cost of maintaining an inventory of print consumables by reducing the human involvement in the printing process and reducing the cost of buying inventory before it is necessary. By automatically checking for and ordering on-line the required print consumables when a print job is received, the printer's inventory does not require a large quantity of print consumables that have to be discarded after an expiration date.

Numerous modifications and variations of the present invention are possible in light of the above teachings. It is therefore to be understood that within the scope of the appended claims, the invention may be practiced otherwise than as specifically described herein.

What is claimed is:

1. On a computer server, a method for managing just-in-time print consumables for a print job, the method comprising:
   estimating print consumable requirements for the print job;
   determining a quantity of print consumables in a print consumable supply inventory;
   comparing the print consumable requirements to the print consumable supply inventory to generate a required print consumable inventory for the print job;
   ordering, over a network connection, the required print consumable inventory from an online print consumable supplier such that the required print consumable inventory is received substantially close to a scheduled printing time for the print job;
   wherein the step of estimating print consumable requirements for the print job is comprised of:
      estimating a composition of the print job; and
      estimating print media requirements in response to the composition of the print job; and
      wherein the step of estimating the composition comprises determining a quantity of pages of text, a quantity of pages of graphics, and a quantity of pages of text and graphics.

2. The method of claim 1 wherein the step of estimating print media requirements for the print job is comprised of:
   estimating marking agent requirements.

3. The method of claim 1 and further including the step of estimating time requirements for the print job.

4. The method of claim 1 wherein the step of estimating print consumable requirements for the print job is comprised of:
   measuring a current quantity of marking agent; and
   estimating a quantity of pages that can be printed in response to the current quantity of marking agent.

5. The method of claim 1 wherein the step of estimating print consumable requirements for the print job is comprised of:
   measuring a current quantity of marking agent; and
   estimating a quantity of pages that can be printed in response to the current quantity of marking agent and an historical analysis of print jobs.

6. The method of claim 1 wherein the ordering comprises ordering in response to a determination that insufficient print consumables exist in inventory to complete printing of the print job.

7. The method of claim 1 wherein the ordering comprises automatically ordering the required print consumable inventory without user input.

8. The method of claim 1 further comprising initiating the ordering using processing circuitry responsive to the comparing.

9. A method for estimating print consumables for a print job in a just-in-time print system, the method comprising:
   estimating a color coverage of the print job;
   estimating a quantity of pages of the print job comprising text;
   estimating a quantity of print media required for the print job;
   estimating finishing supplies required for the print job;
   estimating a quantity of marking agent required for the print job in response to the color coverage and the quantity of pages comprising text;
   transmitting the estimated quantity of marking agent, the estimated quantity of print media and the estimated quantity of finishing supplies to the just-in-time print system;
   estimating a time required for executing the print job; and
   wherein the time required for executing the print job comprises a time for each stage of the just-in-time print system to operate on the print job.

10. The method of claim 9 wherein the just-in-time print system comprises a print service provider.

11. A method for estimating print consumables for a print job in a just-in-time print system, the method comprising:
    determining a current quantity of marking agent;
    determining a quantity of pages of the print job comprising text;
    determining a quantity of pages of the print job comprising graphics;
    determining a quantity of pages of the print job comprising text and graphics;
    generating an estimate of a page capacity of the print consumables in response to the current quantity of marking agent, the quantity of pages of text, the quantity of pages of graphics, and the quantity of pages of text and graphics; and
    transmitting to the just-in-time print system an indication of a quantity of pages corresponding to the estimate of the page capacity of the print consumables.

12. The method of claim 11 and further including displaying the indication of the quantity of pages corresponding to the estimate of the page capacity of the print consumables.

13. The method of claim 11 wherein the step of displaying comprises displaying a bar graph of the quantity of pages.

14. The method of claim 11 wherein the step of displaying comprises displaying a numerical figure of the quantity of pages.

15. The method of claim 11 wherein the step of displaying comprises displaying a numerical figure of the quantity of pages in response to a computer display cursor placed over a predetermined icon on the computer display.

16. A method for estimating print consumables capacity in a just-in-time print system, the method comprising:
    determining a current quantity of marking agent;
    determining a quantity of pages of the print job comprising text;
    determining a quantity of pages of the print job comprising graphics;
    determining a quantity of pages of the print job comprising text and graphics;
    generating an estimate of a page capacity of the print consumables in response to the current quantity of marking agent, the quantity of pages of text, the quantity of pages of graphics, and the quantity of pages of text and graphics;

generating a first icon on a computer display that represents the page capacity of the print consumables displayed in terms of quantity of pages of text;

generating a second icon on a computer display that represents the page capacity of the print consumables displayed in terms of quantity of pages of graphics; and generating a third icon on a computer display that represents the page capacity of the print consumables displayed in terms of quantity of pages of text and graphics.

17. The method of claim 16 and further including moving a computer display cursor over one of the first, the second, or the third icon in order to display the print consumables capacity in terms of quantity of pages remaining.

\* \* \* \* \*

UNITED STATES PATENT AND TRADEMARK OFFICE
CERTIFICATE OF CORRECTION

PATENT NO. : 7,436,530 B2  Page 1 of 1
APPLICATION NO. : 10/132363
DATED : October 14, 2008
INVENTOR(S) : Jody L. Terrill et al.

It is certified that error appears in the above-identified patent and that said Letters Patent is hereby corrected as shown below:

On the Title page, in Item (75), in "Inventors", delete "Camas, WA" and insert -- Rochester, NY --, therefor.

Signed and Sealed this

Eighteenth Day of August, 2009

David J. Kappos
*Director of the United States Patent and Trademark Office*